(12) United States Patent
Yoshimoto

(10) Patent No.: US 7,017,720 B2
(45) Date of Patent: Mar. 28, 2006

(54) FRONT FORK

(75) Inventor: Tsutomu Yoshimoto, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 10/799,587

(22) Filed: Mar. 15, 2004

(65) Prior Publication Data
US 2004/0188975 A1    Sep. 30, 2004

(30) Foreign Application Priority Data
Mar. 27, 2003  (JP)  ............................. 2003-086751
Mar. 28, 2003  (JP)  ............................. 2003-089450

(51) Int. Cl.
*F16F 9/16* (2006.01)
(52) U.S. Cl. .................. 188/315; 188/322.15
(58) Field of Classification Search .............. 188/312, 188/315; 280/276, 283
See application file for complete search history.

(56) References Cited
U.S. PATENT DOCUMENTS

| | | | | |
|---|---|---|---|---|
| 2,029,829 A | * | 2/1936 | Messier | 188/312 |
| 2,630,193 A | * | 3/1953 | Funkhouser | 188/312 |
| 2,657,770 A | * | 11/1953 | Rossman | 188/277 |
| 3,203,511 A | * | 8/1965 | Long, Jr. | 188/315 |
| 3,966,030 A | * | 6/1976 | Sirven | 188/318 |
| 6,244,609 B1 | * | 6/2001 | Wilson | 280/276 |
| 6,318,526 B1 | * | 11/2001 | Kruckemeyer et al. | 188/322.17 |
| 2002/0157910 A1 | * | 10/2002 | Kime | 188/322.16 |
| 2004/0226790 A1 | * | 11/2004 | Tsutomu | 188/315 |

FOREIGN PATENT DOCUMENTS
JP   1-80842   5/1989

* cited by examiner

*Primary Examiner*—Christopher P. Schwartz
(74) *Attorney, Agent, or Firm*—Rabin & Berdo, PC

(57) ABSTRACT

An object of the present invention is to provide a front fork with a double-rod damper, which can improve an efficiency of an assembly operation thereof by simplifying alignment work of piston rods on assembly. To achieve this object, a front fork (30) comprising: an outer tube (1); an inner tube (2) inserted expansibly and contractibly into the outer tube; a double-rod damper (70) disposed inside the outer tube and the inner tube, the double-rod damper including a cylinder (3), a piston (5) received in the cylinder, a first piston rod (6) and a second piston rod (7) extending respectively from each side of the piston and penetrating through the cylinder, wherein an upper chamber (3a) and a lower chamber (3b) are defined between the cylinder and the piston, into which that oil is contained; and a fork-inside oil chamber (71) defined by the outer tube, the inner tube, and the double-rod damper, into which oil and air are contained, the double-rod damper further including: a piston rod connection mechanism (80) that connects at least one of the first piston rod and the second piston rod to the piston such that the one is displaceable in a direction perpendicular to an axis of the piston.

2 Claims, 4 Drawing Sheets

FRONT FORK

FIELD OF THE INVENTION

The present invention relates to a front fork housing a damper therein for a motor cycle. More specially, the present invention relates to a front fork having a double-rod damper.

BACKGROUND OF THE INVENTION

Japanese Unexamined Utility Model Publication No. hei 01-80842 published in 1989 by Japan Patent Office describes a front fork with a double-rod damper where piston rods extend from both sides of a piston.

SUMMARY OF THE INVENTION

However, since in a front fork with a double-rod damper as the related art, a first piston rod supported by a bearing in one end of the cylinder and a second piston rod supported by a bearing in the other end of the cylinder each are tightly secured to both sides of the piston, the first piston rod and the second piston rod should be in accurate, axial alignment before the double-rod damper is assembled. The axial alignment of the first piston rod and the second piston rod involves a lot of complicated operations, deteriorating an efficiency of an assembly operation for the double-rod damper.

Accordingly an object of the present invention is, in view of the foregoing problem, to provide a front fork with a double-rod damper, which can improve an efficiency of an assembly operation thereof by simplifying alignment work of piston rods on assembly.

This object of the present invention is basically attained by providing a front fork that comprises an outer tube; an inner tube inserted expansibly and contractibly into the outer tube; and a double-rod damper disposed inside the outer tube and the inner tube. The double-rod damper includes a cylinder, a piston received in the cylinder, and a first piston rod and a second piston rod extending respectively from each side of the piston and penetrating through the cylinder, wherein an upper chamber and a lower chamber are defined between the cylinder and the piston, into which that oil is contained, and a fork-inside oil chamber defined by the outer tube, the inner tube, and the double-rod damper, into which oil and air are contained. The double rod damper further includes a piston rod connection mechanism that connects at least one of the first piston rod and the second piston rod to the piston such that the one is displaced in a direction perpendicular to an axis of the piston.

These and other objects, features, aspects and advantages of the present invention will become apparent to those skilled in the art from the following detailed description, which, taken in conjunction with the annexed drawings, discloses preferred embodiments of the present invention.

EXPLANATION OF THE PREFERRED EMBODIMENTS OF THE INVENTION

Preferred embodiments of the present invention will be explained with reference to the drawings. It will be apparent to those skilled in the art from this disclosure that the following description of the embodiments of the present invention are provided for illustration only, and not for the purpose of limiting the present invention as defined by the appended claims and their equivalents.

Figure 1:
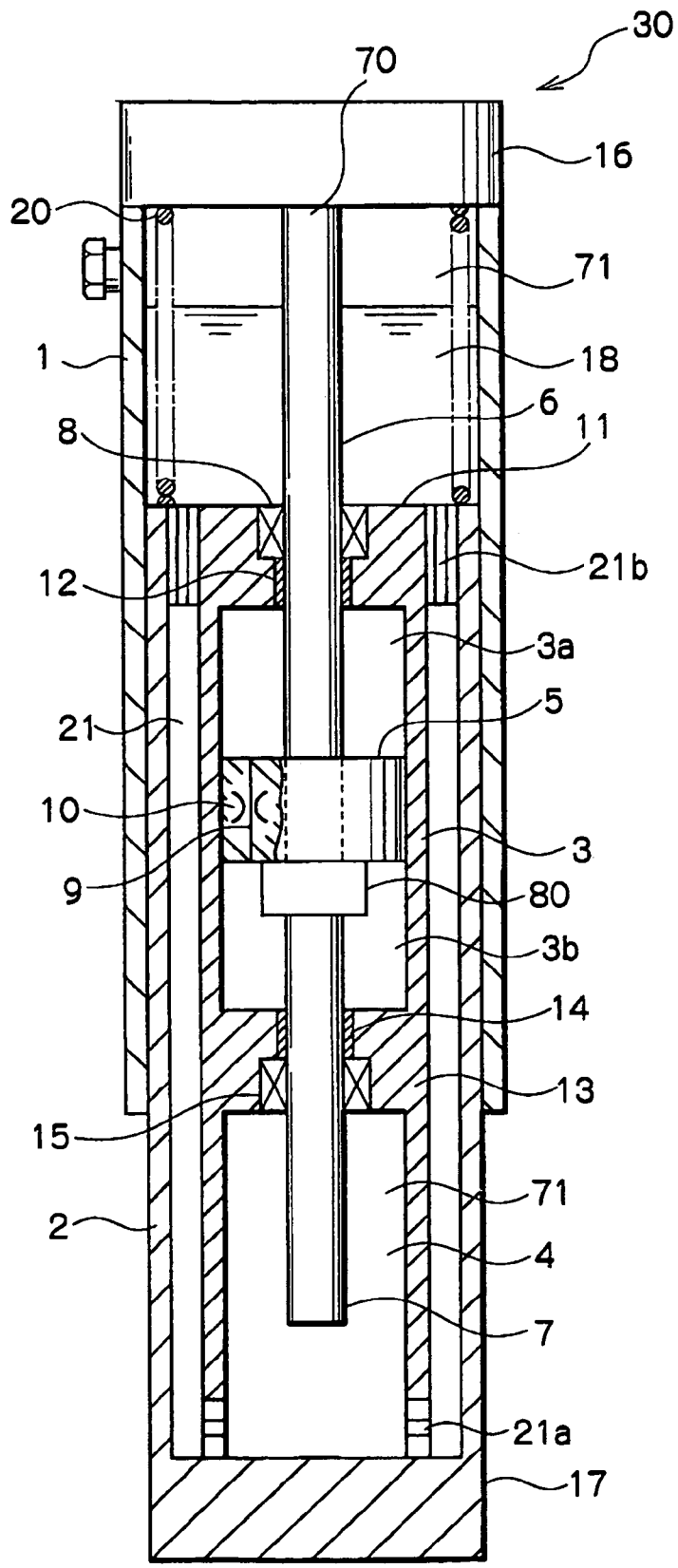
FIG. 1 is a partially-schematic sectional view of a front fork of a first embodiment according to the present invention.

FIG. 1 is a sectional view of a front fork 30 for a motor cycle of a first embodiment according to the present invention.

The front fork 30 is formed of a cylindrical outer tube 1 connected to a vehicle body (not shown), a cylindrical inner tube 2 connected to a wheel (not shown) and placed inside the outer tube 1 as engaged slidably therewith, and a double-rod damper 70 arranged inside the outer tube 1 and the inner tube 2.

A cylinder 3 is disposed coaxial with the inner tube 2 inside thereof and a piston 5 is slidably disposed inside the cylinder 3, to form the double-rod damper 70. The piston 5 divides an inside of the cylinder 3 into an upper chamber 3a and a lower chamber 3b, and has a first passage 9 therein to communicate between the upper chamber 3a and the lower chamber 3b. A damping valve 10 is disposed in the first passage 9, to control a flow amount of oil traveling through the first passage 9.

For example, when the piston 5 moves upward and downward inside the cylinder 3 due to vibrations transmitted from a wheel, the vibrations are damped by resistance that the damping valve 10 gives to the oil traveling through the first passage 9.

A first piston rod 6 extends from an upper face of the piston 5 and penetrates through an upper end wall 11 of the cylinder 3 and a first chamber 18 defined by a lid portion 16 of the outer tube 1 and the upper end wall 11 of the cylinder 3, and then a tip of the first piston rod 6 is connected to the lid portion 16 of the outer tube 1. A second piston rod 7 extends from a lower face of the piston 5 and penetrates through a lower end wall 13 of the cylinder 3 and then a tip of the second piston rod 7 reaches an inside of a second chamber 4 defined by a bottom 17 of the inner tube 2 and the cylinder 3. Herein the first chamber 18 and the second chamber 4 forms a fork-inside oil chamber 71 described later.

A bearing 12 is disposed in the upper end wall 11 of the cylinder 3 and slidably supports the first piston rod 6. The bearing 12 is made of a metal material such as a white metal. A seal member 8 is disposed in the upper wall 11 to be in series with the bearing 12 in an axial direction so that the oil in the upper chamber 3a of the cylinder 3 does not leak from a clearance between the first piston rod 6 and the bearing 12.

A bearing 14 is disposed in the lower end wall 13 of the cylinder 3 and slidably supports the second piston rod 7. The bearing 14 is made of a metal material such as a white metal. A seal member 15 disposed in the lower end wall 13 to be in series with the bearing 14 in an axial direction so that the oil in the lower chamber 3b of the cylinder 3 does not leak from a clearance between the second piston rod 7 and the bearing 14.

The fork-inside oil chamber 71 is defined inside the front fork 30 by the outer tube 1, the inner tube 2, and the cylinder 3 where the fork-inside oil chamber 71 is a closed space the volume of which varies with expansion and contraction of the front fork 30. The first chamber 18 and the second chamber 4 forming the fork-inside oil chamber 71 as described above are communicated with each other through a second passage 21 defined between the inner tube 2 and the cylinder 3, an upper aperture 21a, and a lower aperture 21b.

Oil and air are contained in the fork-inside oil chamber 71 where the volume therein varying with expansion and contraction of the front fork 30 is absorbed by variations of air capacity. When the front fork 30 is contracted, the air contained inside the fork-inside oil chamber 71 is compressed in accordance with a stroke amount of the front fork 30, and functions as an air spring.

A suspension spring 20 that bears loads acting on the front fork 30 is disposed between the upper end wall 11 of the cylinder 3 and the lid portion 16 of the outer tube 1.

By constituting the double-rod damper 70 as described above, the double-rod damper 70 can be expanded and contracted without containing the air into the cylinder 3 housing the piston 5. Accordingly it is prevented that the air enclosed is melted into the oil inside the cylinder 3, and as a result a characteristic of the oil changes, to bring about a change of the damping characteristic of the piston.

Further, in this embodiment, the second piston rod 7 of the double-rod damper 70 is connected through a piston rod connection mechanism 80 to the piston 5 so that the second piston rod 7 can be displaced slightly in a direction perpendicular to an axis thereof.

Figure 2:
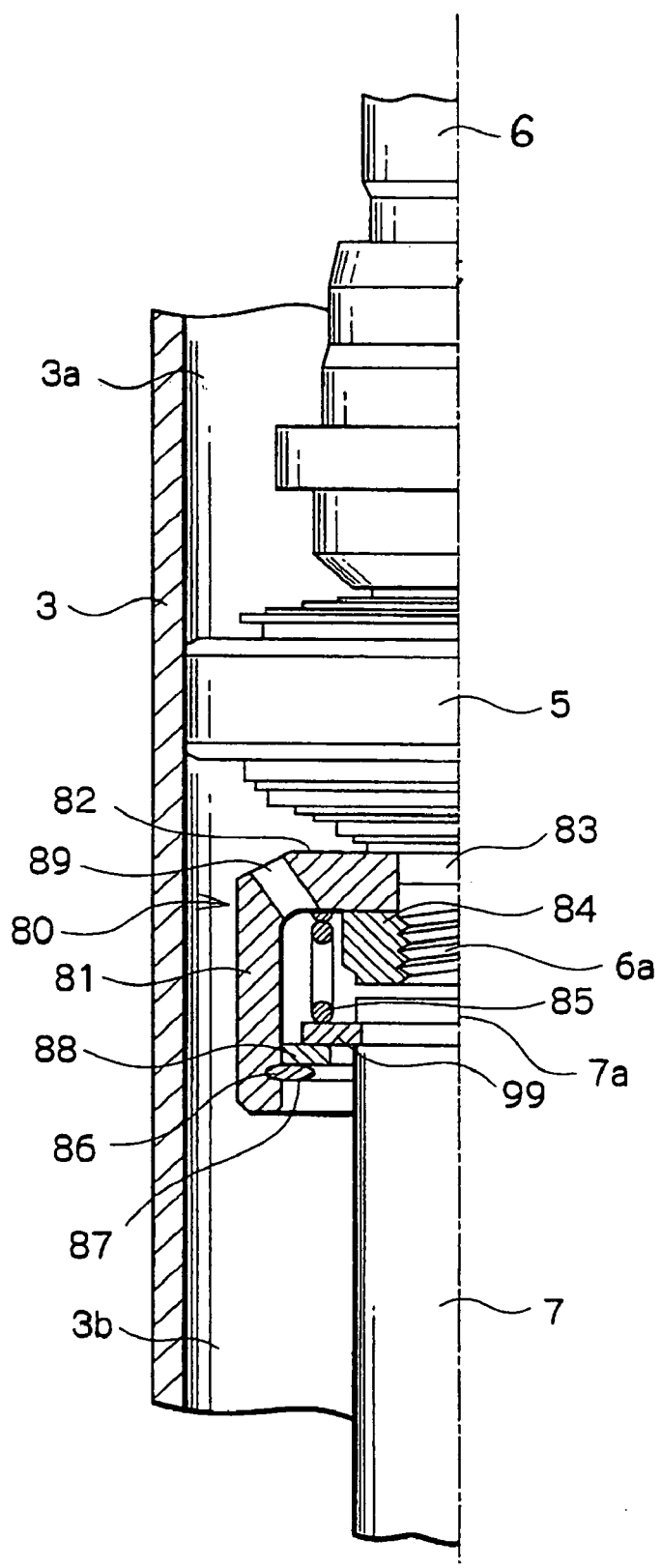
FIG. 2 is a detail sectional view of a piston rod attachment portion of the first embodiment according to the present invention.

FIG. 2 is a detailed sectional view of the piston rod connection mechanism 80.

The piston rod connection mechanism 80 is equipped with a box-shaped holder 81 that is opened to the lower side. A shaft bore 83 is formed in the center of an upper wall 82 of the holder 81 and an end portion 6a of the first piston rod 6 penetrates through the shaft bore 83. The end portion 6a of the first piston rod 6 penetrates through the piston 5 and the shaft bore 83, and thereafter is secured to the piston 5 by a nut 84. The holder 81 is secured to the piston 5 by sandwiching the upper wall 82 of the holder 81 between the piston 5 and the nut 84.

A snap ring 87 is disposed in an inner surface of a lower end portion 86 of the holder 81. A stop ring 99 is disposed in an end portion 7a of the second piston rod 7, and is housed in the holder 81. A spacer 88 is interposed between the snap ring 87 and the stop ring 99, to prevent the stop ring 99 from dropping out of the snap ring 87. An inner diameter of the spacer 88 is formed larger than an outer diameter of the second piston rod 7, which allows the second piston rod 7 to slightly move in a radial direction, that is, in a direction perpendicular to the axis of the piston 5. This motion is possible with sliding of the spacer 88 on the stop ring 99.

The stop ring 99 is urged toward the snap ring 87 by a spring 85 disposed co-axially with the holder 81 inside thereof. A communicating aperture 89 that communicates between an inside and an out side of the holder 81 is formed in the holder 81. The communicating aperture 89 maintains the pressure inside the holder 81 and the pressure outside the holder 81 at the same level.

The first piston rod 6 extends through a bearing 12 disposed in an upper wall 11 of the cylinder 3 outside thereof and the second piston rod 7 extends through a bearing 14 disposed in a lower wall 13 of the cylinder 3 outside thereof. However, in the event the first piston rod 6 and the second piston rod 7 are not in axial alignment, the rods 6, 7 do not slide smoothly on the bearing 12 and the bearing 14 respectively.

According to the embodiment, the piston rod connection mechanism 80 connects the second piston rod 7 to the piston 5 and thereby, the deviation of the second piston rod 7 in a radial direction thereof can be compensated for. As a result a slight deviation in axial alignment between the first piston rod 6 and the second piston rod 7 in a radial direction is allowable and an accurate alignment work between them on assembly can be avoided, improving a production efficiency of the double-rod damper.

Figure 3:
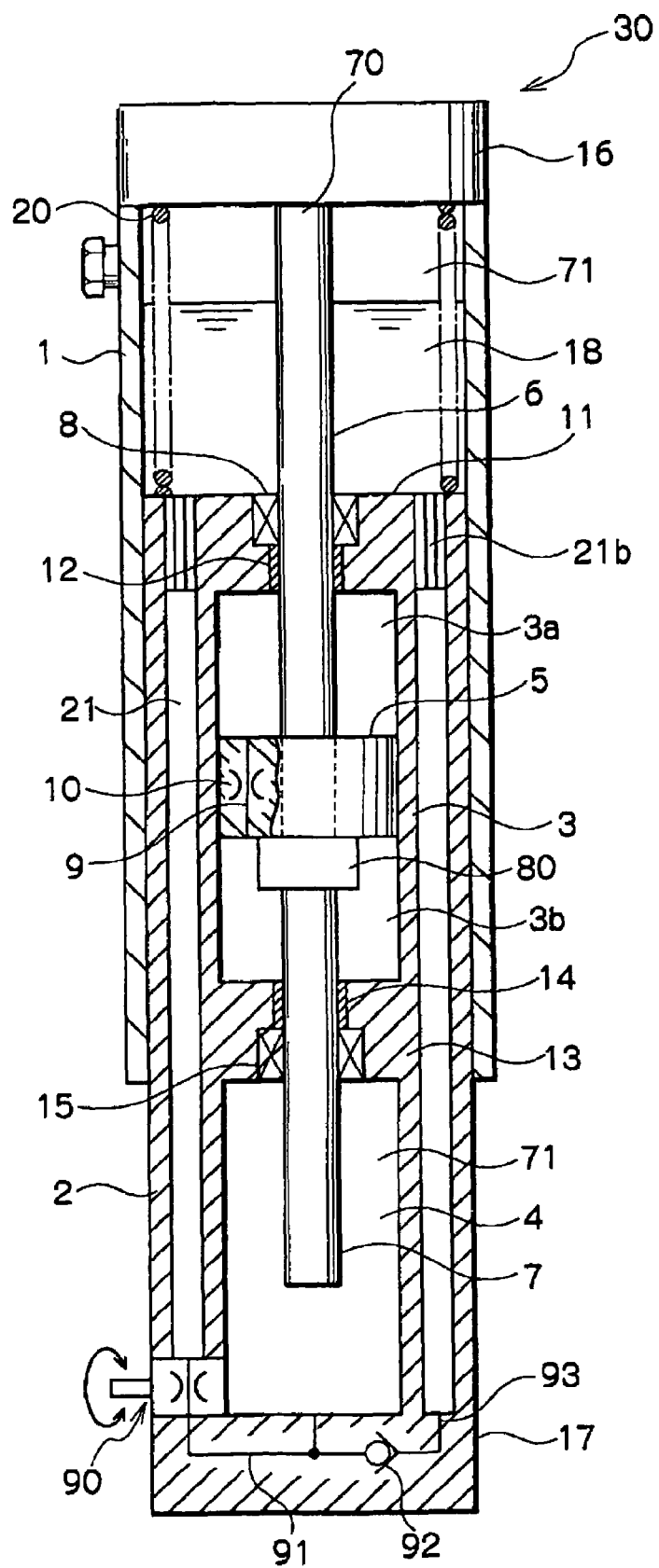
FIG. 3 is a partially-schematic sectional view of a front fork of a second embodiment according to the present invention.

FIG. 3 is a view of a second embodiment according to the present invention.

In the second embodiment, the upper first chamber 18 and the lower second chamber 4 are communicated by a third passage 91 formed in the bottom 17 of the inner tube 2. A variable damping valve 90 is disposed in the third passage 91, and an amount of oil flowing in the passage 91 is controlled by operating the variable damping valve 90 from the outside of the front fork 30. A fourth passage 93 is formed in parallel with the third passage 91 to communicate between the upper first chamber 18 and the lower second chamber 4. The fourth passage 93 has a check valve 92 that allows only one-way flow of the oil therein from the upper first chamber 18 to the lower second chamber 4.

Figure 4:
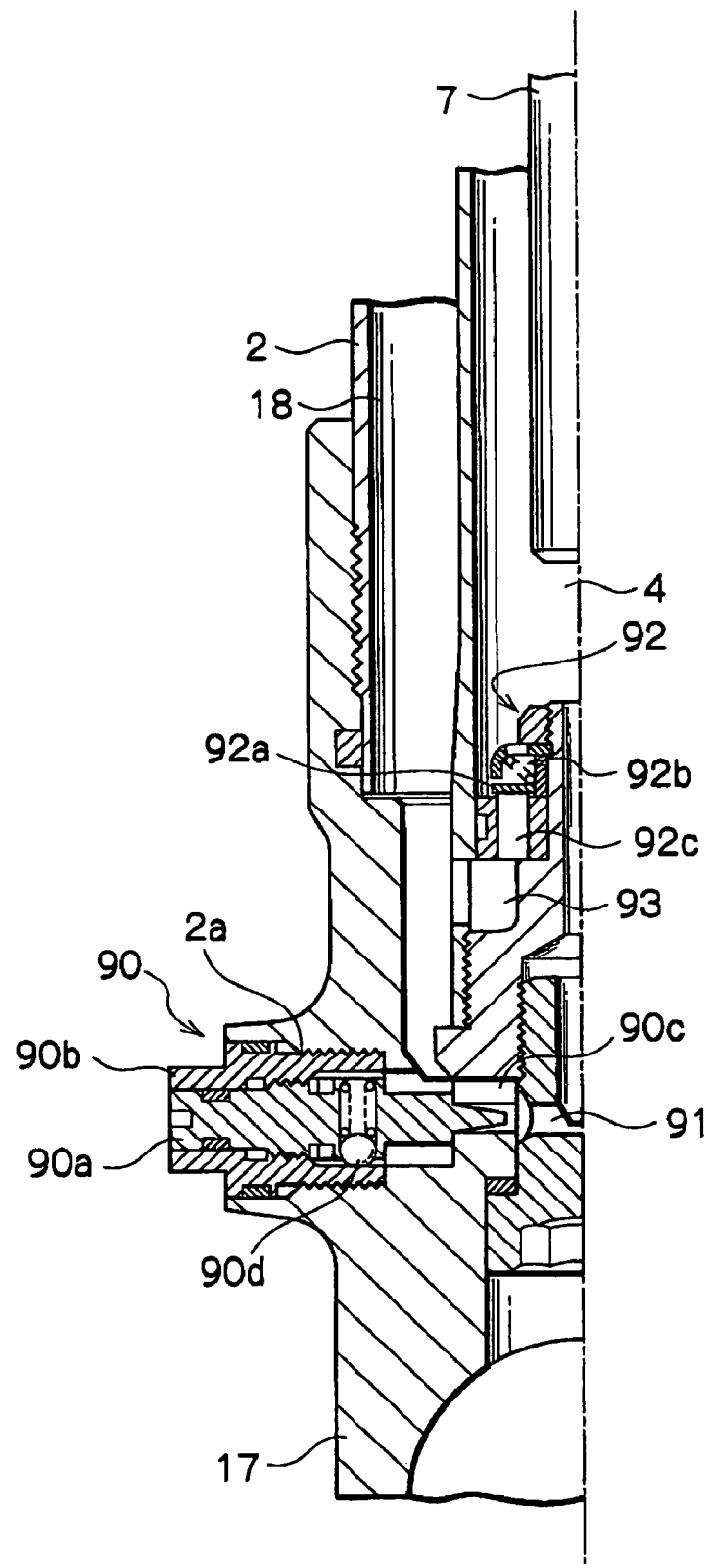
FIG. 4 is a detail sectional view of a variable damping valve of the second embodiment according to the invention.

FIG. 4 is a detailed sectional view showing the variable damping valve 90 and the check valve 92.

The variable damping valve 90 includes a valve casing 90b threaded in a boss 2a of the inner tube 2, and a valve body 90a screwed into the valve casing 90b where a throttling resistance of the oil flowing between a valve seat 90c of a part of the bottom 17 and a tip of the valve body 90a is regulated by adjusting an opening distance therebetween due to rotating the valve body 90a. The variable damping valve 90 further includes a detent mechanism 90d that determines a rotation position of the valve body 90a.

The check valve 92 is formed of a leaf valve and includes a leaf spring 92b in a valve housing and a flat member 92a urged by the leaf spring 92b, which closes a port 92c. When pressure in the upper first chamber 18 becomes higher than pressure in the lower second chamber 4, the oil in the side of the upper first chamber 18 pushes up the flat member 92a and then flows from the port 92c into the lower second chamber 4.

Components of the second embodiment other than the described-above components are identical to those in the first embodiment and are referred as to identical numerals thereof.

When the front fork 30 is contracted, the second piston rod 7 enters into the lower second chamber 4 and the oil equivalent to the volume of the entered second piston rod 7 is pushed out through the third passage 91 into the upper first chamber 18. Since at this moment the variable damping valve 90 causes the throttling resistance to the oil flowing through the third passage 91, a damping force of the front fork 30 is increased. Namely the damping force of the variable damping valve 90 is added to the damping force of the double-rod damper 70.

On the other hand, when the front fork 30 is expanded, the second piston rod 7 is retreated back from the lower second chamber 4 and the pressure in the lower second chamber 4 is reduced. Then, the oil equivalent to the volume of the retreated second piston rod 7 is pulled in through the third passage 91 from the upper first chamber 18 to the lower second chamber 4 and also at this moment, the flat member 92a of the check valve 92 in the fourth passage 93 is opened against the leaf spring 92b by the pressure difference between the upper first chamber 18 and the lower second chamber 4 and promotes pulling in the oil into the lower second chamber 4.

Accordingly when the front fork 30 is expanded, it is prevented that the pressure in the lower second chamber 4 becomes negative, since the oil flow resistance caused by the variable damping valve 90 is nearly not produced.

Also the damping force produced by the variable damping valve 90 can be easily regulated due to changing a screwed amount of the valve body 90*a* of the variable damping valve 90 into the valve casing 90*b*.

In the embodiments, the second piston rod 7 is connected to the piston 5 through the piston rod connection mechanism 80, it is apparent that the first piston rod 6 may be connected to the piston 5 through the piston rod connection mechanism 80.

The embodiments are, as described above, explained with specific words to some extent with regard to features of the structures and methods thereof, but these means disclosed in this specification cover the preferred embodiments for carrying out the present invention and it is understood that the present invention is not limited to the specific features illustrated and described herein. Accordingly the present invention includes any modes and alternations within the scope described in the claims that be properly construed based upon the principle of equivalency.

What is claimed is:

1. A front fork comprising:

an outer tube;

an inner tube inserted expansibly and contractibly into the outer tube;

a double-rod damper disposed inside the outer tube and the inner tube, the double-rod damper including a cylinder, a piston received in the cylinder, a first piston rod and a second piston rod extending respectively from each side of the piston and penetrating through the cylinder, wherein an upper chamber and a lower chamber are defined between the cylinder and the piston, into which that oil is contained; and a fork-inside oil chamber defined by the outer tube, the inner tube, and the double-rod damper, into which oil and air are contained, the double-rod damper further including:

a piston rod connection mechanism that connects at least one of the first piston rod and the second piston rod to the piston such that the one is displaceable in a direction perpendicular to an axis of the piston; the piston rod connection mechanism including;

a hollow holder that is opened at a lower side thereof and connected to the piston, the hollow holder receiving an end portion of the first piston rod or the second piston rod;

a snap ring disposed in a lower side of an inner surface of the hollow holder;

a stop ring engaged with the end portion of the first piston rod or the second piston rod; and a spacer through which the stop ring is supported to the snap ring.

2. The front fork as set forth in claim 1, wherein the piston rod connection mechanism includes a mechanical connection between the piston and the at least one of the first piston rod and the second piston rod, and the mechanical connection allows the one piston rod to be displaceable in the direction perpendicular to the axis of the piston.

* * * * *